(12) United States Patent
Cheng et al.

(10) Patent No.: US 7,688,590 B2
(45) Date of Patent: Mar. 30, 2010

(54) THERMAL MODULE AND ELECTRONIC APPARATUS USING THE SAME

(75) Inventors: Chau-Wen Cheng, Taipei (TW); Chi-Wei Tien, Taipei (TW); Chang-Yuan Wu, Taipei (TW); Ya-Ping Lin, Taipei (TW)

(73) Assignee: Compal Electronics, Inc., Taipei (TW)

( * ) Notice: Subject to any disclaimer, the term of this patent is extended or adjusted under 35 U.S.C. 154(b) by 3 days.

(21) Appl. No.: 12/110,336

(22) Filed: Apr. 27, 2008

(65) Prior Publication Data

US 2008/0285234 A1 Nov. 20, 2008

(30) Foreign Application Priority Data

May 14, 2007 (TW) .............................. 96116999 A

(51) Int. Cl.
*H05K 7/20* (2006.01)
(52) U.S. Cl. ...................... 361/700; 361/695; 361/697; 174/15.2; 165/80.4; 165/104.33
(58) Field of Classification Search ................ 361/690, 361/695, 698, 700; 174/15.2; 165/80.4, 165/104.26, 104.33
See application file for complete search history.

(56) References Cited

U.S. PATENT DOCUMENTS

| 6,867,971 | B2* | 3/2005 | Lai ............................ 361/697 |
| 7,079,394 | B2* | 7/2006 | Mok .......................... 361/700 |
| 7,262,965 | B2* | 8/2007 | Cheng ........................ 361/697 |
| 7,380,585 | B2* | 6/2008 | Liu et al. ............... 165/104.33 |
| 7,460,370 | B2* | 12/2008 | Cheng et al. ................ 361/700 |
| 2007/0133174 | A1* | 6/2007 | Mikami et al. .............. 361/700 |

* cited by examiner

*Primary Examiner*—Boris L Chervinsky
(74) *Attorney, Agent, or Firm*—Jianq Chyun IP Office

(57) ABSTRACT

A thermal module suitable for cooling a heat generating element within a casing of an electronic apparatus includes a fan, a heat sink and a heat pipe. The fan is mounted within the casing for generating airflow to an opening of the casing. The heat sink is mounted within the casing between the opening of the casing and the fan, such that the airflow generated by the fan passes through the heat sink and then flows out of the opening. The heat pipe contacts the heat generating element, extends from the heat generating element to the heat sink, and extends along a periphery of the fan to contact the heat generating element again.

13 Claims, 3 Drawing Sheets

THERMAL MODULE AND ELECTRONIC APPARATUS USING THE SAME

CROSS-REFERENCE TO RELATED APPLICATION

This application claims the priority benefit of Taiwan application serial no. 96116999, filed on May 14, 2007. The entirety the above-mentioned patent application is hereby incorporated by reference herein and made a part of specification.

BACKGROUND OF THE INVENTION

1. Field of the Invention

The present invention relates to a thermal module, and more particularly, to a thermal module for use with an electronic apparatus.

2. Description of Related Art

With rapid advance of computer technology in recent years, computers are being made to operate at higher frequency, and the heat generation of electronic components in computer host are becoming greater and greater. To avoid temporary or permanent failure of the electronic components in the computer host due to overheat thereof, the heat generated by the electronic components must be sufficiently dissipated. Therefore, thermal modules are necessarily attached to those electronic components having high heat generation such as CPUs, Graphics Chips, Northbridge Chips, Southbridge Chips, and random-access memory modules, or the like, for cooling these electronic components.

Taking a notebook computer as an example, due to the limitation to the size of the notebook computer, the notebook computer has a small interior space within a base unit. As a result, the provision of a thermal module is very important. Besides, to improve the heat dissipating efficiency while keeping the noise of the fan in an acceptable level, the computer base unit has widely adopted the heat pipe technology to dissipate heat.

FIG. 1 is a perspective view of a conventional thermal module employed in an electronic apparatus. Referring to FIG. 1, the conventional thermal module 100 includes a fan 110, a heat sink 120, and a heat pipe 130. The thermal module 100 is mounted within the electronic apparatus. The electronic apparatus includes a heat generating element 10, a circuit board 20 and a casing 30. The heat generating element 10 is disposed within the casing 30 and mounted on the circuit board 20. The fan 110 is mounted in the casing 30. The fan 110 has an air outlet 112 oriented toward an opening 32 of the casing 30, for discharging airflow generated by the fan 110 to an exterior of the casing 30 via the opening 32. The heat sink 120 is mounted within the casing 30 between the outlet 112 of the fan 110 and the opening 32 of the casing 30, such that the airflow generated by the fan 110 passes through the heat sink 120 and exits the casing 30 via the opening 32. The heat pipe 130 contacts the heat generating element 10 and extends to the heat sink 120.

As the electronic apparatus operates, the heat generating element 10 generates a large amount of heat. In this case, the heat generated by the heat generating element 10 is first transferred to the heat pipe 130 and then to the end of the heat pipe 130 that extends to the heat sink 120. Next, the heat sink 120 absorbs the heat on the heat pipe 130, and the airflow passing through the heat sink 120 takes the heat out of the casing 30.

For convenience of carriage, the electronic apparatus, especially the notebook computers, are trending toward lightweight and low-profile design. To achieve lower-profile of the casing 30, thickness of components within the casing 30 must be reduced as much as possible. However, to keep sufficient heat dissipating performance, the thickness of the heat pipe 130 of the thermal module 100 cannot be reduced as desired, which has become a hindrance to the low-profile design.

SUMMARY OF THE INVENTION

The present invention is directed to a thermal module for being mounted to an electronic apparatus to dissipate heat.

The present invention is directed to an electronic apparatus which includes a thermal module to dissipate heat.

The present invention provides a thermal module adapted for cooling a heat generating element within a casing of an electronic apparatus. The thermal module comprises a fan, a heat sink and a heat pipe. The fan is mounted within the casing for generating airflow to an opening of the casing. The heat sink is mounted within the casing between the opening of the casing and the fan, such that the airflow generated by the fan passes through the heat sink and then flows out of the opening. The heat pipe contacts the heat generating element, extends from the heat generating element to the heat sink, and extends along a periphery of the fan to contact the heat generating element again.

In one embodiment of the present invention, one segment of the heat pipe contacting the heat generating element and the other segment of the heat pipe contacting the heat generating element are positioned close to each other.

In one embodiment of the present invention, the one segment and the other segment of the heat pipe extend in parallel with each other.

In one embodiment of the present invention, the fan comprises an air inlet around which the heat pipe extends.

In one embodiment of the present invention, the heat pipe is a flat configuration.

In one embodiment of the present invention, the heat pipe extends through the heat sink.

The present invention also provides an electronic apparatus. The electronic apparatus includes a casing, a heat generating element and a thermal module. The heat generating element is mounted within the casing. The thermal module is adapted for cooling the heat generating element. The thermal module comprises a fan, a heat sink and a heat pipe. The fan is mounted within the casing for generating airflow to an opening of the casing. The heat sink is mounted within the casing between the opening of the casing and the fan, such that the airflow generated by the fan passes through the heat sink and then flows out of the opening. The heat pipe contacts the heat generating element, extends from the heat generating element to the heat sink, and extends along a periphery of the fan to contact the heat generating element again.

In one embodiment of the present invention, one segment of the heat pipe contacting the heat generating element and the other segment of the heat pipe contacting the heat generating element are positioned close to each other.

In one embodiment of the present invention, the one segment and the other segment of the heat pipe extend in parallel with each other.

In one embodiment of the present invention, the fan comprises an air inlet around which the heat pipe extends.

In one embodiment of the present invention, the heat pipe is a flat configuration.

In one embodiment of the present invention, the heat pipe extends through the heat sink.

In one embodiment of the present invention, the electronic apparatus further includes a circuit board mounted within the casing, and the heat generating element is mounted on the circuit board.

In summary, the present invention may use a single heat pipe having an annular configuration to contact the heat generating element with a plurality of heat pipe segments to enhance the heat dissipating performance. In addition, the present invention can use a heat pipe with lower profile, which provides the thermal module design with more flexibility.

In order to make the aforementioned and other features and advantages of the present invention more comprehensible, embodiments accompanied with figures are described in detail below.

DESCRIPTION OF THE EMBODIMENTS

Figure 2A:
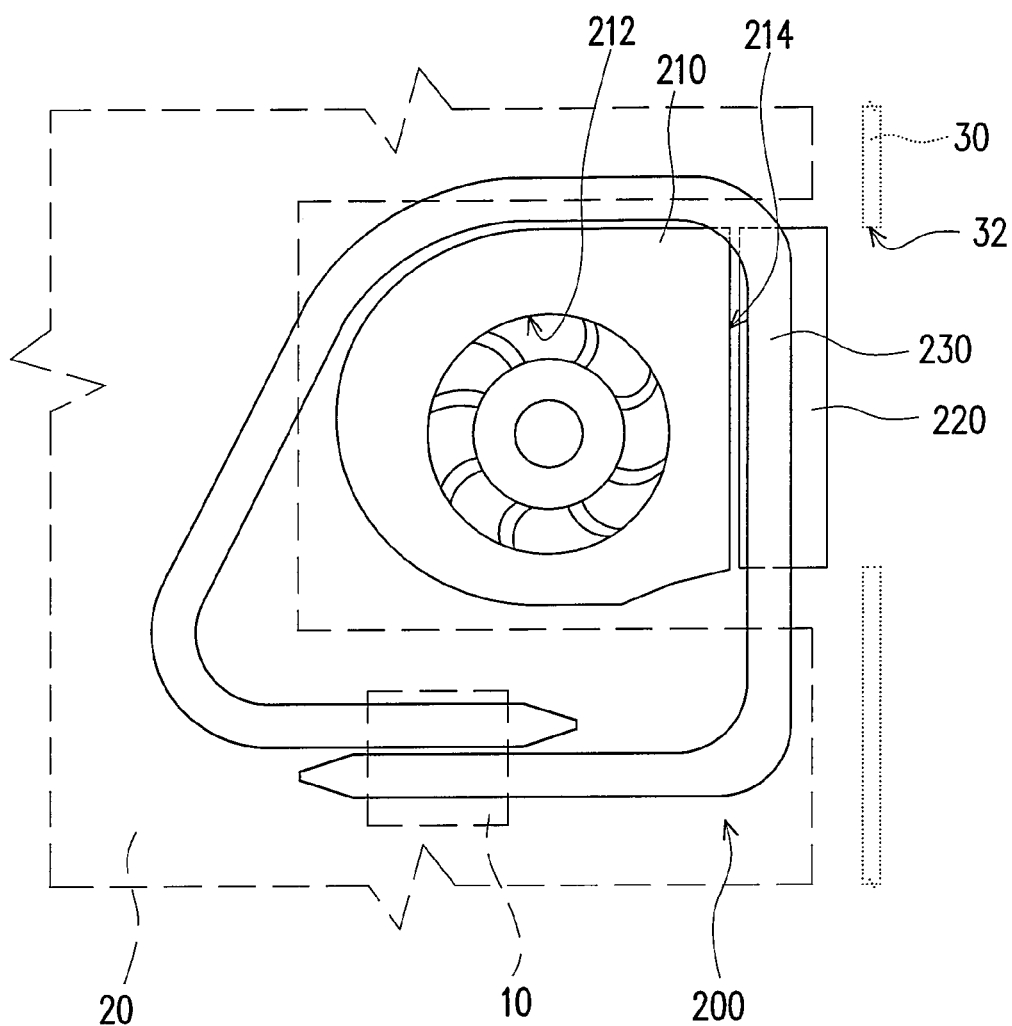
FIG. 2A is a perspective view of a thermal module employed in an electronic apparatus in accordance with one embodiment of the present invention.

FIG. 2A is a perspective view of a thermal module employed in an electronic apparatus in accordance with one embodiment of the present invention. Referring to FIG. 2A, the thermal module 200 is suitable for cooling a heat generating element 10 in a casing 30 of an electronic apparatus, such as CPU or the like. The electronic apparatus may be a notebook computer, for example, and the heat generating element 10 may be mounted on a circuit board 20.

The thermal module 200 includes a fan 210, a heat sink 220 and a heat pipe 230. The fan 210 is mounted in the casing 30 for generating airflow toward an opening 32 of the casing 30. The heat sink 220 is mounted within the casing 30 between the opening 32 and the fan 210, such that the airflow generated by the fan 210 passes through the heat sink 220 and then flows out of the opening 32.

Figure 2B:
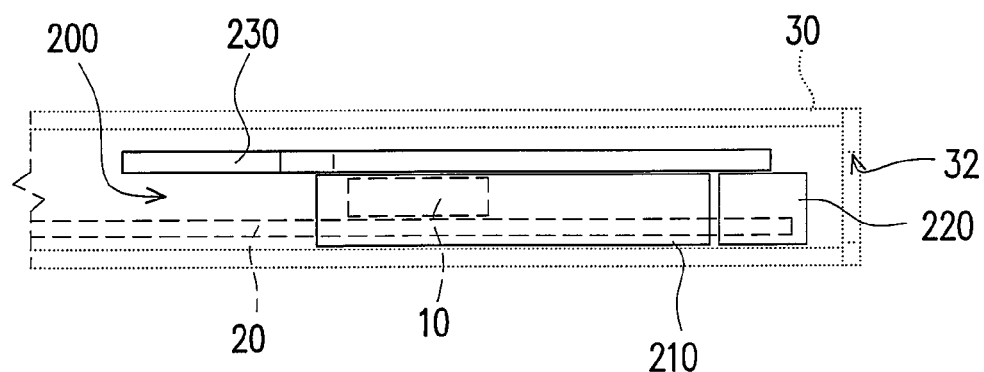
FIG. 2B is a side view of the thermal module and electronic apparatus of FIG. 2A.

FIG. 2B is a side view of the thermal module and electronic apparatus of FIG. 2A. Referring to FIGS. 2A and 2B, the heat pipe 230 in contact with the heat generating element 10 extends from the heat generating element 10 to the heat sink 220, and then extends along a periphery of the fan 210 to contact the heat generating element 10 again. In this way, heat generated from the heat generating element 10 can be transferred via two segments of the heat pipe 230 to the segment of the heat pipe 230 contacting the heat sink 220. In the illustrated embodiment, one segment of the heat pipe 230 contacting the heat generating element 10 and the other segment of the heat pipe 230 contacting the heat generating element 10 may be positioned close to each other. In addition, the two segments of the heat pipe 230 contacting the heat generating element 10 may extend in parallel with each other.

In the illustrated embodiment, the heat pipe 230 contacts the heat sink 220 by simply placing the heat pipe 230 over the heat sink 220. In another embodiment not shown, however, the heat pipe 230 may also extend through the heat sink 220 to increase the contact area between the heat pipe 230 and the heat sink 220. In addition, the heat pipe 230 may have a flat configuration. Furthermore, a heat conductive plate (not shown) may be disposed between the heat generating element 10 and the heat pipe 230, which acts as a heat transfer media between the heat generating element 10 and the heat pipe 230. The heat conductive plate may be formed of copper.

Figure 1:
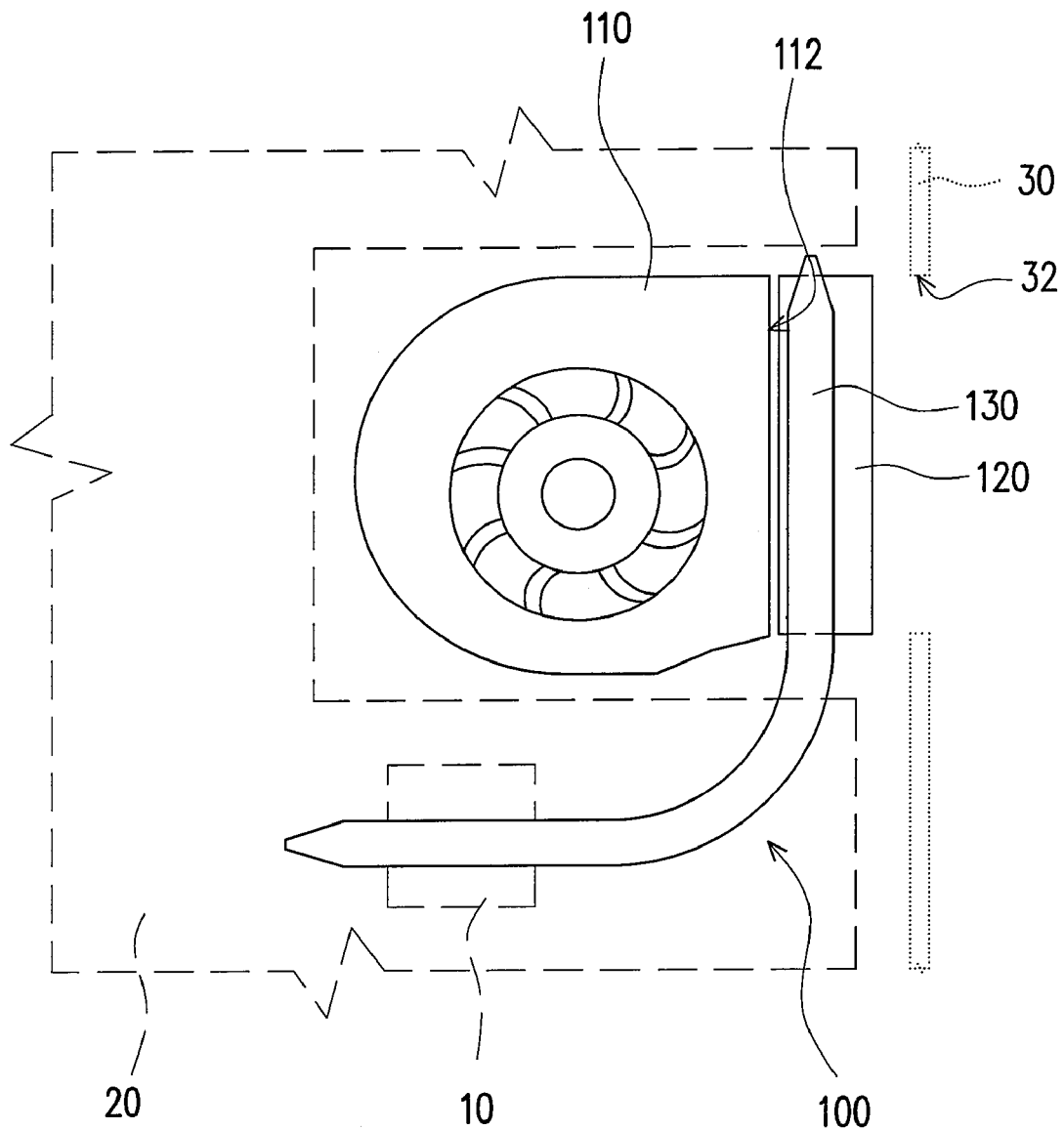
FIG. 1 is a perspective view of a conventional thermal module employed in an electronic apparatus.

It should be noted that the heat pipe 230 contacts the heat generating element 10 with two heat pipe segments, such that the contact area between the heat pipe 230 and the heat generating element 10 can be increased, thereby enhancing the heat dissipating performance. To provide a same heat dissipating performance, the heat pipe 230 of this embodiment may have a smaller thickness in comparison with the conventional heat pipe 130 as shown in FIG. 1 that contacts the heat generating element 10 with a single heat pipe segment. As such, the thickness of the casing 30 can be reduced with the reducing of the heat pipe 230 thickness, thus allowing the casing 30 of the electronic apparatus to have a lower profile.

In addition, the fan 210 may have an air inlet 212 and an air outlet 214, and the heat pipe 230 extends around the air inlet 212. As the fan 210 operates, air is drawn into the air inlet 212 and flows to the heat sink 220 through the air outlet 214. The airflow passing through the heat sink 220 flows out of the opening 32, thereby taking the heat on the heat sink 220 to an exterior of the casing 30.

Figure 3:
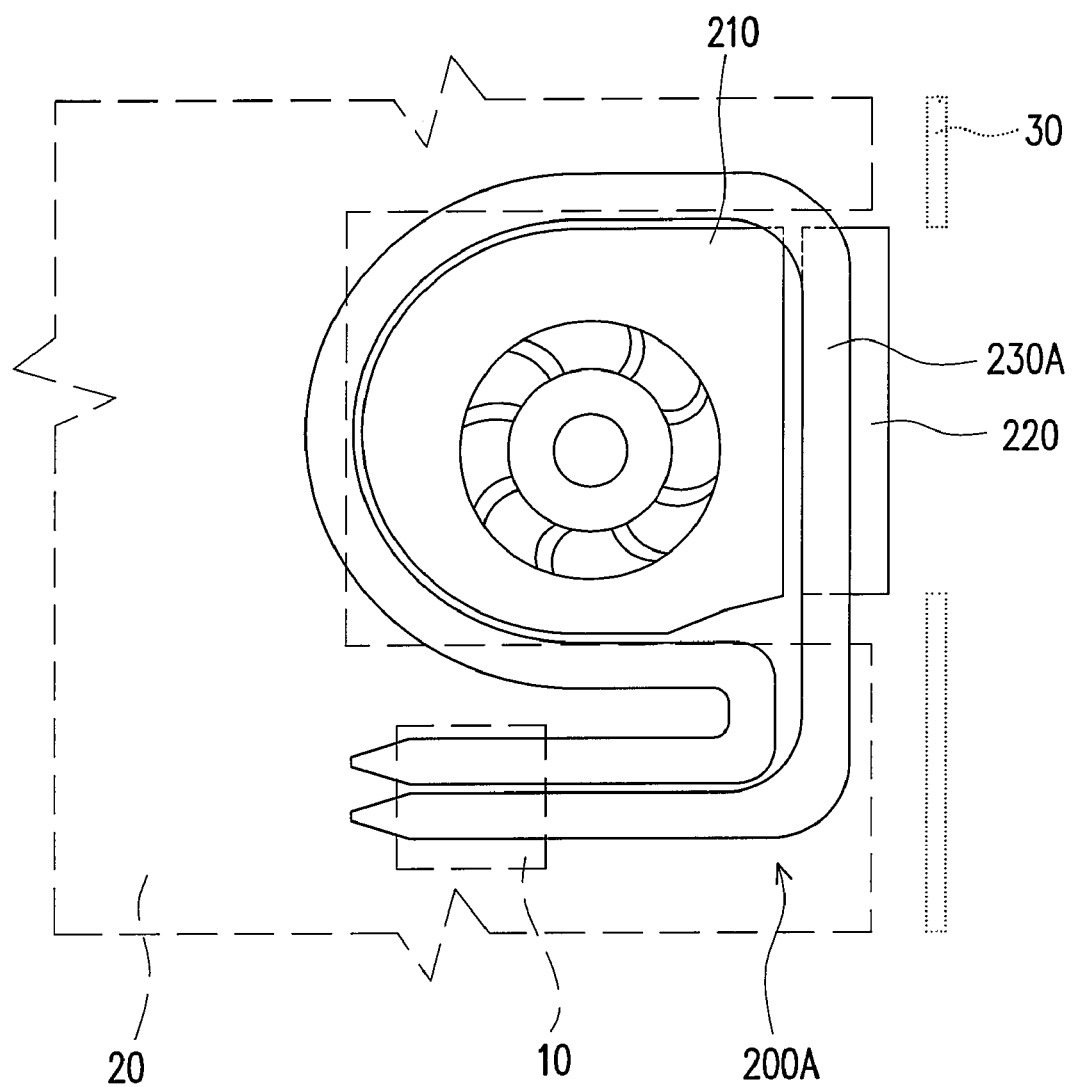
FIG. 3 is a perspective view of a thermal module employed in an electronic apparatus in accordance with another embodiment of the present invention.

FIG. 3 is a perspective view of a thermal module employed in an electronic apparatus in accordance with another embodiment of the present invention. Referring to FIG. 3, the thermal module 200A is similar to the thermal module 200, except that the heat pipe 230 is replaced with a heat pipe 230A. The heat pipe 230A and the heat pipe 230 are different in that they are bent into different shapes. The heat pipe 230A surrounds almost the entire periphery of the fan 210, and the two segments of the heat pipe 230A contacting the heat generating element 10 are positioned close to each other and extend in the same direction.

In the embodiments described above, the thermal module 200 and 200A are illustrated as being employed in an electronic apparatus. In another embodiment, the present invention provides an electronic apparatus which includes the casing 30 and the heat generating element 10 as well as the thermal module 200 and 200A as illustrated above. Moreover, in still another embodiment, the electronic apparatus may further include the circuit board 20 described above.

In summary, the present invention employs a heat pipe having an annular configuration that contacts the heat generating element with a plurality of heat pipe segments to enhance the heat dissipating performance. Therefore, the advantage of the present invention over the heat pipe that contacts the heat generating element with a single segment includes at least the following:

1. The heat pipe of the present invention can transfer more heat from the heat generating element such that the heat dissipating performance of thermal module is enhanced.

2. Instead of using multiple heat pipes to enhance heat dissipating performance, the present invention proposes using a single heat pipe to reduce cost.

3. To provide same heat transfer performance, the present invention proposes a heat pipe with lower profile, thereby reducing the thickness of the thermal module and making it possible to design lower-profile electronic apparatus.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A thermal module, adapted for cooling a heat generating element within a casing of an electronic apparatus, comprising:
   - a fan mounted within the casing for generating airflow to an opening of the casing;
   - a heat sink mounted within the casing between the opening of the casing and the fan, such that the airflow generated by the fan passes through the heat sink and then flows out of the opening; and
   - a heat pipe, two ends of the heat pipe contacting the heat generating element, extending from the heat generating element to the heat sink, and extending along a periphery of the fan to contact the heat generating element again.

2. The thermal module in accordance with claim 1, wherein one segment of the heat pipe contacting the heat generating element and the other segment of the heat pipe contacting the heat generating element are positioned close to each other.

3. The thermal module in accordance with claim 2, wherein the one segment and the other segment of the heat pipe extend in parallel with each other.

4. The thermal module in accordance with claim 1, wherein the fan comprises an air inlet around which the heat pipe extends.

5. The thermal module in accordance with claim 1, wherein the heat pipe is a flat configuration.

6. The thermal module in accordance with claim 1, wherein the heat pipe extends through the heat sink.

7. An electronic apparatus, comprising:
   - a casing;
   - a heat generating element mounted within the casing; and
   - a thermal module adapted for cooling the heat generating element, the thermal module comprising:
     - a fan mounted within the casing for generating airflow to an opening of the casing;
     - a heat sink mounted within the casing between the opening of the casing and the fan, such that the airflow generated by the fan passes through the heat sink and then flows out of the opening; and
     - a heat pipe, two ends of the heat pipe contacting the heat generating element, extending from the heat generating element to the heat sink, and extending along a periphery of the fan to contact the heat generating element again.

8. The electronic apparatus in accordance with claim 7, wherein one segment of the heat pipe contacting the heat generating element and the other segment of the heat pipe contacting the heat generating element are positioned close to each other.

9. The electronic apparatus in accordance with claim 8, wherein the one segment and the other segment of the heat pipe extend in parallel with each other.

10. The electronic apparatus in accordance with claim 7, wherein the fan comprises an air inlet around which the heat pipe extends.

11. The electronic apparatus in accordance with claim 7, wherein the heat pipe is a flat configuration.

12. The electronic apparatus in accordance with claim 7, wherein the heat pipe extends through the heat sink.

13. The electronic apparatus in accordance with claim 7, further comprising a circuit board mounted within the casing, wherein the heat generating element is mounted on the circuit board.

* * * * *